United States Patent [19]

Leone

[11] Patent Number: 4,779,351
[45] Date of Patent: Oct. 25, 1988

[54] DIAL CALIPER REFERENCE COMPENSATING DEVICE

[76] Inventor: Joseph M. Leone, 17342 Woodbine, Detroit, Mich. 48219

[21] Appl. No.: 926,123

[22] Filed: Nov. 3, 1986

[51] Int. Cl.⁴ ............................................. G01B 5/02
[52] U.S. Cl. ............................. 33/147 T; 33/143 M
[58] Field of Search .............. 33/143 R, 143 M, 143 J, 33/143 K, 147 R, 147 T, 147 J, 167, 158

[56] References Cited

U.S. PATENT DOCUMENTS

| | | | |
|---|---|---|---|
| 3,266,159 | 8/1966 | Scholl | 33/143 M |
| 4,077,129 | 3/1978 | Nishikata | 33/143 M |
| 4,570,349 | 2/1986 | Finkelman | 33/143 M X |
| 4,608,759 | 9/1986 | Bowhay | 33/143 M |

FOREIGN PATENT DOCUMENTS

| | | | |
|---|---|---|---|
| 150343 | 2/1932 | Switzerland | 33/143 M |
| 222673 | 7/1968 | U.S.S.R. | 33/143 T |

*Primary Examiner*—Harry N. Haroian
*Attorney, Agent, or Firm*—Charles W. Chandler

[57] ABSTRACT

This invention is related to a dial caliper comprising a beam, a depth rod having a linear scale, and an indicator mounted on the beam adjacent the scale to provide a reading that compensates for the distance occupied by an accessory mounted between the workpiece measuring jaws carried by the dial caliper.

3 Claims, 1 Drawing Sheet

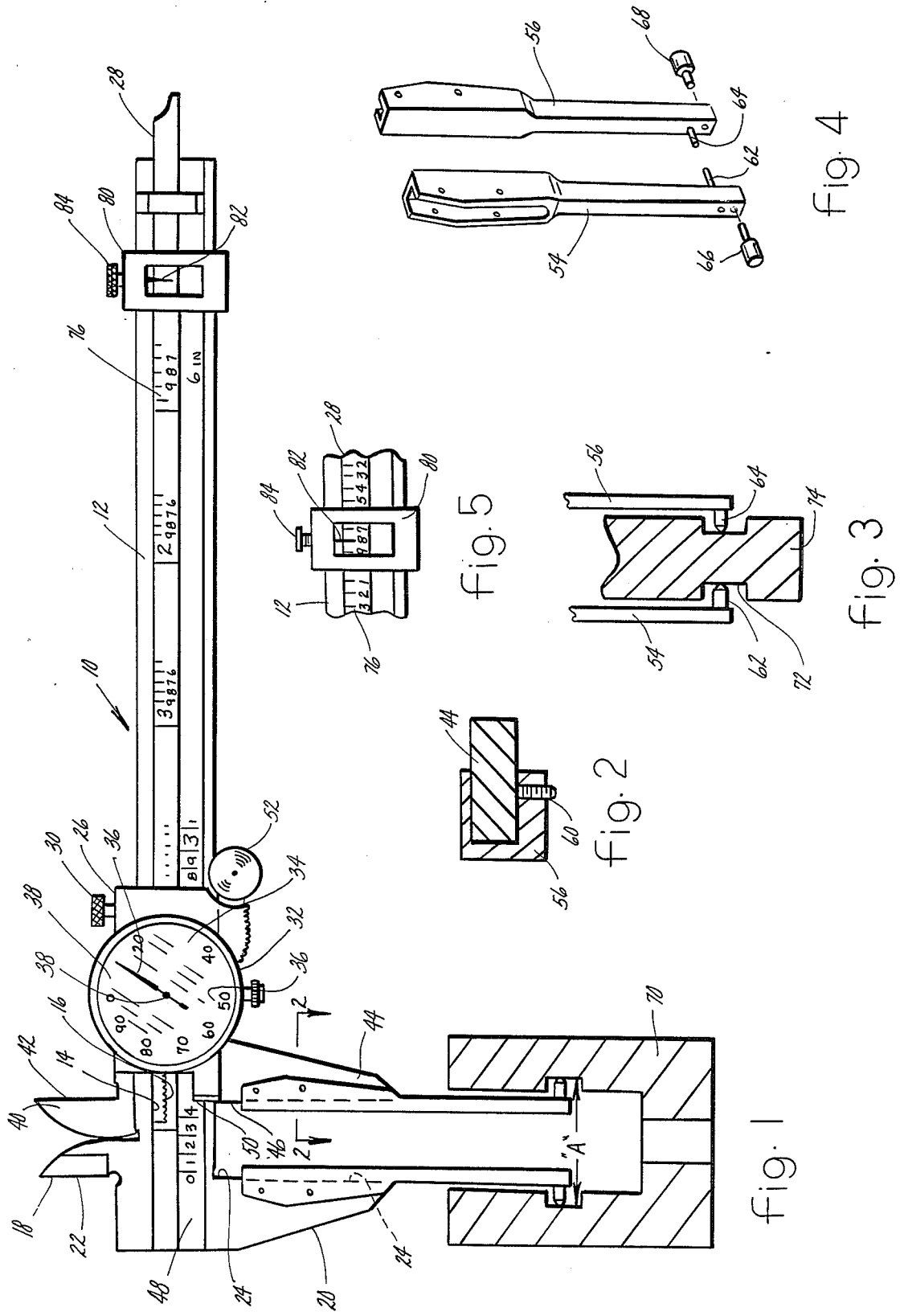

DIAL CALIPER REFERENCE COMPENSATING DEVICE

BACKGROUND OF THE INVENTION

This invention is related to dial calipers comprising a slider slideably mounted on a caliper beam having a scale along the beam, and a dial indicator for measuring relatively small increments of the beam scale, and including a second scale along the depth rod with an adjustable pointer on the beam to permit the user to reset the zero value of the caliper when an accessory is being used on the workpiece-measuring jaws, to compensate for the distance added by the accessory to that of the workpiece.

A conventional dial caliper has a pair of jaws that engage a workpiece to either measure an outside or inside dimension. A slider carries one jaw, and the beam carries the other jaw. The two jaws are set to a base zero figure when the jaws are in abutment. When the jaws are opened to receive a workpiece, the user reads the distance between the jaws according to a scale mounted along the edge of the beam and a dial indicator mounted on the slider.

A problem arises when certain types of accessories are mounted on the jaws such as, for example, a pair of arms for measuring the inside of a cylindrical cavity in a location too deep for the conventional jaws. The problem is that the arms occupy a certain amount of space between the jaws and thus increase the reading along the scale over the actual dimension of the workpiece. Usually lengthy and cumbersome calculations must be made to first find the actual deviation added or reduced to the zero reading on the scale on the beam, and then the user must add or subtract that deviation from the measurement indicated.

SUMMARY OF THE INVENTION

The broad purpose of the present invention is to provide an improved dial caliper for automatically compensating for the space occupied by an accessory mounted on the jaws, and more particularly to providing a scale on the depth rod reading in the reverse direction with respect to the conventional scale on the beam, and a pointer adjustably clamped on the beam to indicate a new zero base reference. For example, if the accessory, such as a pair of feeler arms is mounted on the jaws, and the arms take up 0.500 inch, the two jaws occupy a closed position corresponding to a 0.500 inch measurement on the conventional scale, even though no workpiece is being measured. The user moves the pointer on the beam to the zero reference on the depth rod scale to indicate the new base reference so that a measaurement of the workpiece by the feeler arms reflects the actual measurement of the workpiece and excludes the space occupied by the feeler arms. The user, upon aligning the pointer opposite the new zero base reference, also rotates the dial gage face so that it also reflects the location of the new zero base reference.

Still further objects and advantages of the invention would become readily apparent to those skilled in the art to which the invention pertains upon reference to the following detailed description.

DESCRIPTION OF THE DRAWING

The description refers to the accompanying drawing in which like reference characters refer to like parts throughout the several views and in which:

FIG. 1 is a view of a dial caliper illustrating the preferred embodiment of the invention with a pair of feeler arms employed to measure the inside dimension of a cavity;

FIG. 2 is an enlarged view seen along lines 2—2 of FIG. 1, showing the manner in which the feeler arms are attached to the jaws;

FIG. 3 is a view showing the manner in which the feeler arm contacts can be reversed to measure the outside dimension of a workpiece;

FIG. 4 is an exploded view of the feeler arms; and

FIG. 5 is a view of the pointer mounted on the caliper beam.

DESCRIPTION OF THE PREFERRED EMBODIMENT

Referring to the drawing, a preferred dial caliper, generally indicated at 10, comprises an elongated metal beam 12 having a channel 14. An elongated rack 16 is disposed in the channel. The beam carries a jaw 18 which extends from one side of the beam, and a second longer jaw 20 which extends from the opposite side of the beam. Jaw 18 has a linear measuring edge 22 on the outside of the jaw, whereas jaw 20 has a linear measuring edge 24 on the inside of the jaw.

Slider frame 26 is mounted on the beam and has a rigidly afixed depth rod 28 slideably disposed in channel 14 for longitudinal movement with respect to the beam. The depth rod is employed for measuring the depth of an opening as is well known to those skilled in the art. Thumb screw 30 is mounted on the slider frame and engageable with the beam for locking the slider to the beam.

A dial indicator is mounted on the slider frame and has contained within it, the means (not shown) for engaging rack 16 so that needle 36 is rotated by means of center pinion 38 as the slider is moved along the beam. As the slider is moved toward the right, as viewed in FIG. 1, the needle rotates in the clockwise direction.

The dial indicator also has a bezel 34 which can be rotated with respect to the frame and carries indicia on annular scale or dial face 36 for indicating the slider being moved each 0.001 inch along the beam. The scale has a zero reading at 38.

The frame carries a second jaw 40 having a linear outside edge 42 which cooperates with jaw 18 in measuring the inside dimension of an opening in a workpiece (not shown). The frame also carries a second, longer jaw 44 having an inside linear edge 46 so that a workpiece can be disposed between jaws 20 and 44 for measuring an outside dimension of the workpiece.

Linearly arranged indicia on scale 48 is mounted along the lower edge of the beam, as illustrated in FIG. 1, and begins with the base figure of "0" at the left end of the scale. A dimension-measuring marker 50 on jaw 44 is disposed and adjacent the "0" location when the inside linear edges of jaws 20 and 44 are in abutment. The dial indicator is adjusted so that needle 36 is adjacent the "0" figure on the dial face.

A thumb-operated member 52 provides means for rolling the slider frame along the beam to either open or close the jaws depending upon the nature of the workpiece being measured. In conventional practice, either the workpiece is placed between jaws 20 and 44, or jaws 18 or 40 are placed inside the workpiece. The distance between the two jaws is then measured and read directly from scale 48 and the face of the dial indicator.

FIG. 4 illustrates a pair of feeler arms 54 and 56 which may be clamped on jaws 20 and 44 for measuring a location such as at "A" in FIG. 1, a location normally inaccessible for measuring with a conventional dial caliper. Feeler arms 54 and 56 are identical but are mounted in a right and left hand relationship on jaws 20 and 44. FIG. 2 illustrates threaded fastener means 60 used on a feeler arm to clamp it to jaw 44. Several threaded fasteners may be employed. The lower arms 54 and 56 carry a pair of inside contact points 62 and 64 for measuring the outside dimension of a workpiece, and a second pair of contact members 66 and 68 for measuring the inside dimension of a workpiece, such as 70 shown in FIG. 1.

FIG. 3 illustrates the manner in which feeler members 62 and 64 are employed for measuring groove 72 of a workpiece 74.

The problem with employing arms 54 and 56 when they are mounted on jaws 20 and 44 is that when feeler members 62 and 64 are in abutment, they define a new base reference location which deviates from the "0" base location of scale 48. To compensate for this deviation, linearly spaced indicia or scale 76 is formed along depth rod 28 and may be either in the form of a tape or permanently marked on the depth rod in the conventional spacing but reading in reverse, that is, from right to left as opposed to left to right of scale 48.

Indicator 80 is slideably mounted on the beam and has a pointer 82 which is lined up against a selected measurement on scale 76. Thumb screw 84 provides means for clamping the indicator in a particular position along the beam.

In use, when the accessory arms are being mounted on jaws 20 and 44, contact points 62 and 64 are disposed in abutment with one another. Indicator 80 is then moved along the beam so that pointer 82 is adjacent the "0" marking on the depth rod scale to indicate the new base reference reading.

The bezel of the dial indicator is also rotated so that the "0" reading is adjacent needle 36. The workpiece is then disposed between contact points 62 and 64. In so doing, the jaws are spaced thereby moving the depth rod along the beam toward the right to a position in which scale 76 directly reads the outside dimension of the workpiece according to the position of pointer 82 and the dial indicator.

The same procedure can be employed by mounting appropriate accessory arms on jaws 18 and 40 for measuring other locations that are normally difficult to measure with the conventional jaws.

The preferred embodiment of the invention eliminates lengthy and cumbersome calculations for compensating for the deviation from the normal "0" reading by providing means for directly reading the actual dimension of a workpiece without calculating the deviation caused by accessory arms 54 and 56. The deviation from the normal zero is always factored in when the dimension of a workpiece is being measured.

Having described my invention, I claim:

1. A dial caliper, comprising:
an elongated caliper beam having a channel;
a first work-engaging member mounted on the caliper beam;
a slider slidably mounted on said caliper beam having a second work-engaging member;
an elongated depth rod attached to the slider and being slidable within the channel of the caliper beam such that the first work-engaging member is adapted to cooperate with the second work-engaging member in making a measurement;
first dimension-measuring means mounted on the beam and the slider for making a measurement according to the distance between the first working-engaging member and the second working-engaging member, the first dimension-measuring means including a marker and a first linear scale of longitudinally spaced indicia on the beam having a first base reference corresponding to a first position of the first work-engaging member with respect to the second work-engaging member, the marker being movable with respect to the first base reference along the first linear scale as the first work-engaging member is moved with respect to the second work-engaging member;
second dimension-measuring means mounted on the depth rod and the beam for making a measurement according to the distance between the first work-engaging member and the second work-engaging member, the second dimension measuring means including a second linear scale of longitudinally-spaced indicia on the depth rod having a second base reference adapted to be located in an adjusted position according to a second position of the first work-engaging member with respect to the second work-engaging member, and a pointer adjustable mounted on the beam adjacent the second linear scale and movable independently of the second linear scale so as to be located adjacent the adjusted position of the second base reference; and
a dial indicator mounted on the slider and adapted to be adjusted to a zero setting depending upon whether the user is making a measurement according to the location of the marker with respect to the first linear scale or the location of the pointer with respect to the second linear scale.

2. A dial caliper as defined in claim 1 in which the first linear scale is adapted to increase in a first longitudinal direction, and the second linear scale is adopted to increase in the opposite direction.

3. A combination as defined in claim 1, in which the dial indicator has a dial member and a face with indicia that can be adjusted according to the position of the dial member.

* * * * *